F. C. HANEY.
BEARING SLEEVE EXTRACTOR.
APPLICATION FILED AUG. 22, 1921.

1,430,164.

Patented Sept. 26, 1922.

F. C. Haney
Inventor

By Watson E. Coleman Attorney

Patented Sept. 26, 1922.

1,430,104

UNITED STATES PATENT OFFICE.

FRANK C. HANEY, OF POWELL, WYOMING.

BEARING-SLEEVE EXTRACTOR.

Application filed August 22, 1921. Serial No. 494,185.

*To all whom it may concern:*

Be it known that I, FRANK C. HANEY, citizen of the United States, residing at Powell, in the county of Park and State of Wyoming, have invented certain new and useful Improvements in Bearing-Sleeve Extractors, of which the following is a specification, reference being had to the accompanying drawings.

This invention relates to means for extracting bearing sleeves, and particularly bearing sleeves of roller bearings.

The roller bearing sleeves such as used in the rear axle housings of automobiles are difficult to remove in view of the fact that the sleeve is wedged so firmly in the housing. It requires considerable time and labor to remove the sleeve and even then it is difficult to remove the same without marring or destroying the sleeve in such a way that it cannot be used again and must be replaced by a new sleeve.

It is, therefore, the primary object of this invention to provide a novel tool which is capable of readily removing a roller bearing sleeve without damaging the same or requiring any length of time or unnecessary labor on the part of the operator.

It is another object of the invention to provide a tool of this character having a portion thereof formed and arranged to extend through the sleeve whereby the sleeve may be readily forced from the axle housing without damaging the sleeve.

It is also an object of the invention to provide a tool of this character adapted to be inserted through one end of the rear axle housing into engagement with the bearing sleeve, said tool being provided with means for gradually forcing the tool and the sleeve outwardly of the housing and in the direction of the tool.

It is still a further object of the invention to provide a tool of this character having a finger formed on one end thereof for engagement with the bearing sleeve, and an anvil carried by the tool adjacent the opposite end thereof, said anvil being adapted to be struck by a hammer element movably mounted on the tool to cause removal of the bearing sleeve.

With these and other objects in view, the invention consists in the improved construction and arrangement of parts to be hereinafter more particularly described, fully claimed and illustrated in the accompanying drawings, in which:—

Figure 1:
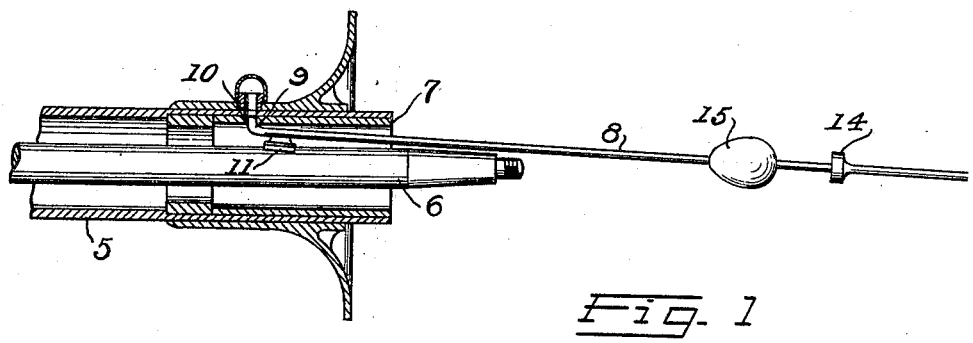
Figure 1 is a fragmentary sectional view of a rear axle housing and axle showing the invention in use.
Figure 2:
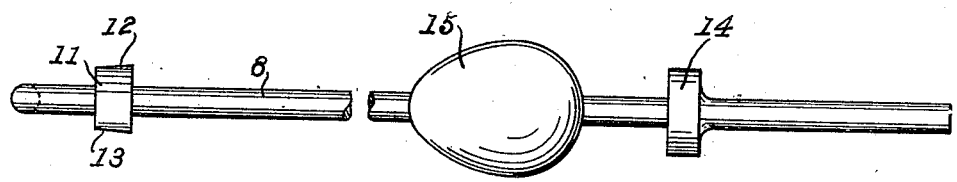
Figure 2 is a bottom plan view of the structure of the tool shown in Figure 1.
Figure 3:
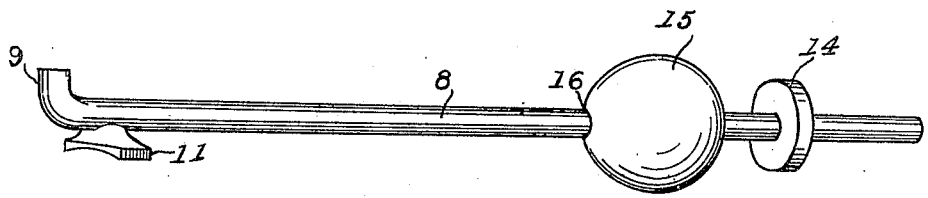
Figure 3 is a perspective view.

Referring the the drawings, 5 designates the rear axle housing of an automobile in which a shaft 6 is mounted. A roller bearing sleeve 7 is disposed within the end of the housing and is adapted to receive roller bearings.

In order to prevent rotary movement of the sleeve, it is necessary when the housing and shaft are assembled to firmly wedge the sleeve within the housing, but this renders the sleeve exceedingly difficult to remove even by damaging the sleeve to remove the same. This disadvantage is overcome by a novel form of tool which comprises a bar 8 which may be of any length desired and of a diameter to permit insertion of the tool between the roller bearing sleeve and the axle. The extremity of one end portion of the bar 8 is extended substantially at right angles to the bar to provide a work engaging finger 9, the length of the finger being such as to permit insertion of the bar within the axle housing and is intended to be inserted in the opening 10 provided in the bearing sleeve 7.

The bar 8 is properly positioned when in use by means of a supporting member or brace 11 which consists of a strip of metal curved to conform to the contour of the axle, and having its end portions 12 and 13 beveled in the same direction so as to form a wedge. The supporting member 11 is adapted to be secured at its intermediate portion to the end of the bar 8 adjacent the finger 9, but a sufficient distance from the finger 9 to properly position the tool when the same is being engaged with the bearing sleeve 7.

Mounted on the opposite end of the bar 8 and secured to or formed integral therewith is an anvil member 14, said member being disposed inwardly of the last mentioned end of the bar so as to permit the operator to grasp the bar, the anvil member thereby substantially forming a hilt for the tool. In order to permit removal of the bearing sleeve from the axle housing without causing the instrument to be inserted in the opposite end of the housing in engagement with the inner end of the sleeve 7, there is provided a novel hammer element 15, said hammer element being substantially egg-shaped and having a central opening 16, larger in diameter than the bar 8 for the reception of said bar. The hammer element is slidable and rotatable on the bar between the supporting member 11 and the anvil 14.

In the use of the device, the tool is inserted in the axle housing and into the sleeve, the brace 11 engaging the axle so as to support the tool in its sliding movement into the sleeve. This is possible in view of the fact that the brace 11 conforms to the contour of the axle. When the finger 9 reaches the opening 10 of the sleeve, the brace or supporting member 11 serves as a fulcrum to permit insertion of the finger 9 into the opening 10, and as the supporting member 11 moves above the sleeve, the beveled ends 12 and 13 will wedge against the inner face of the sleeve so as to prevent accidental disengagement of the finger from the opening. The operator then grasps the opposite end or the handle portion of the tool and with the other hand moves the hammer element into engagement with the anvil, successive blows on the anvil causing the sleeve to be easily and properly removed from the housing without damaging the sleeve or requiring unnecessary strain on the part of the operator.

From the foregoing it will be readily seen that this invention provides a novel tool for extracting bearing sleeves which is simple in construction and may be readily used by an unskilled person without damaging the bearing sleeve. Furthermore, it eliminates the necessity of removing the axle in order to remove the sleeve and as its parts are few and substantial, it will last indefinitely.

What is claimed is:—

A tool of the character described comprising a bar having a work engaging finger on one end thereof, said finger extending to one side of the tool, a supporting member carried by said tool adjacent the work engaging finger, an anvil element carried by the opposite end of the tool in spaced relation to said last mentioned end to provide a handle and a hammer element slidable on the tool between the supporting member and the anvil whereby the tool and work are moved in accordance with the blow delivering movement of the hammer element.

In testimony whereof I hereunto affix my signature.

FRANK C. HANEY.